United States Patent
Aoki et al.

(10) Patent No.: US 6,344,801 B1
(45) Date of Patent: Feb. 5, 2002

(54) APPARATUS FOR OPERATING INSTRUMENTS FOR VEHICLE

(75) Inventors: Kunimitsu Aoki; Yoshiyuki Furuya; Takeyuki Amari; Koji Ishii; Masayuki Ogawa; Ichiro Kataoka, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/401,863

(22) Filed: Sep. 22, 1999

(30) Foreign Application Priority Data

Sep. 24, 1998 (JP) ............................................ 10-270258

(51) Int. Cl.[7] ................................................ G08G 5/00
(52) U.S. Cl. ..................... 340/815.4; 340/458; 340/459; 340/461; 701/1; 701/36; 701/49; 307/10.1
(58) Field of Search ........................ 340/825.34, 825.69, 340/825.72, 825.31, 825.44, 449, 459, 460, 461, 438, 825.32, 815.4; 701/1, 36, 69; 307/10.1, 10.8, 10.7, 9.1; 62/186, 244, 259.2, 407

(56) References Cited

U.S. PATENT DOCUMENTS

| | | | | |
|---|---|---|---|---|
| 4,827,520 A | * | 5/1989 | Zeinstra ........................... | 701/1 |
| 4,837,551 A | * | 6/1989 | Iino ................................ | 345/7 |
| 4,853,687 A | * | 8/1989 | Isomura et al. ........... | 340/820.3 |
| 4,876,594 A | * | 10/1989 | Schiffman ....................... | 345/7 |
| 4,914,705 A | * | 4/1990 | Nigawara .................... | 704/270 |
| 6,131,060 A | * | 10/2000 | Obradovich et al. .......... | 701/49 |

* cited by examiner

Primary Examiner—Daryl Pope
(74) Attorney, Agent, or Firm—Finnegan, Henderson, Farabow, Garrett & Dunner, L.L.P.

(57) ABSTRACT

The names of a plurality of instruments connected to a bus are displayed on a screen. An operator presses a mode selection switch, so that one of the names of the plurality of electrical instruments displayed on the screen of the monitor can be selected. A controller selectively displays the name on the screen selected by the mode selection switch. The operator can operate the instrument corresponding to the name on the screen selected by the mode selection switch with using a direction key.

9 Claims, 16 Drawing Sheets

APPARATUS FOR OPERATING INSTRUMENTS FOR VEHICLE

BACKGROUND OF THE INVENTION

1. Field of the Invention

The present invention relates to an apparatus for operating instruments for a vehicle, for selecting each electrical instrument of a plurality of electrical instruments connected to a network (bus) by an operation switch and operating the selected electrical instrument.

2. Description of the Background Art

Audio instruments such as a cassette tape deck, a CD player, and a radio are-mounted as electrical instruments on a vehicle such as an automobile, and a desirable audio instrument is selected from these audio instruments by an operation switch to operate the selected audio instrument.

As a conventional operation switch of this type, for example, as shown in FIG. 1, it is known that one function (e.g., a CD) is allocated to one switch 101.

A plurality of functions may be allocated to one operation switch. For example, to an operation switch 105 constituted by a seesaw switch shown in FIG. 2, the functions of TUNE, TRACK, and FF·REW are allocated. In the example shown in FIG. 3, push switches 106 to 109 and a display 110 are combined to each other.

A direction key 111 constituted by a joy stick is used to operate a navigation system.

These switches are generally laid out in 1.5 DIN to 2 DIN. The specific functions are allocated to the switches, respectively.

In addition, when the switch 101 to which one function is allocated as shown in FIG. 1 is used to operate the instruments such as an AM.FM (RADIO), a TAPE, a CD, and a TV, four switches 113a to 113d must be arranged correspondingly to the four instruments, respectively, and operation of a target instrument is performed by selecting a corresponding switch of the four switches 113a to 113d.

However, when a conventional instrument is multi-functional depending on the specification of the instrument, the number of switches increases. For this reason, the operation of the instrument is disadvantageously complex. With rapid development of an information-oriented society, a device whose function is not limited and which can cope with networks and has high extendability is demanded.

SUMMARY OF THE INVENTION

It is an object of the present invention to provide an apparatus for operating instruments for a vehicle, which can cope with the extendability of a network without respectively arranging selection switches for electrical instruments and which can improve the operability of a selected electrical instrument.

In order to achieve the above object, there is provided an apparatus for operating instruments for a vehicle, the apparatus including: display means for displaying names of a plurality of electrical instruments connected to a bus on a screen; mode selection means for selecting one of the names of the plurality of electrical instruments displayed on the screen of the display means; display control means for selectively displaying the name on the screen selected by the mode selection means; and instrument operation means for operating an electrical instrument corresponding to the name on the screen selected by the mode selection means.

According to the present invention, when the names of a plurality of electrical instruments connected to a bus are displayed on the screen of the display means, and one of the names of the plurality of electrical instruments displayed on the screen of the display means is selected by the mode selection means, the display control means selectively displays the selected name on the screen selected by the mode selection means. Accordingly, the selected name can be easily recognized, and the names of the plurality of electrical instruments can be selected by one mode selection means. Therefore, a selection switch need not be formed in each of the electrical instruments, and the apparatus for operating instruments for a vehicle can cope with the extendability of a network. An electrical instrument corresponding to the name on the screen selected by the mode selection means can be operated by the instrument operation means.

In a preferable embodiment of the present invention, the instrument operation means is a direction key for designating a direction, and the direction key includes: a plurality of printed-character units on which at least one operation function for each electrical instrument is printed to be allocated; and a plurality of illumination units provided for the plurality of printed-character units, each illumination unit being arranged opposite to a corresponding printed-character unit and illuminating the corresponding printed-character unit.

According to this aspect, since the plurality of illumination units formed on the direction key illuminate the plurality of printed-character units formed on the direction key, the plurality of printed-character units are bright. The plurality of printed-character units are obtained by printing the operation functions of the electrical instruments, and the operation functions of the electrical instruments are allocated. Accordingly, one direction key is multi-functional so that a small number of operation switches are required.

In a preferable embodiment of the present invention, an apparatus for operating instruments for a vehicle further includes illumination control means for, when a name of an electrical instrument is selected by the mode selection means, operating an illumination unit to illuminate a corresponding printed-character unit, of the plurality of printed-character units, on which an operation function for the electrical instrument corresponding to the selected name is printed.

According to this aspect, when the name of the electrical instrument is selected by the mode selection means, the illumination control means operates an illumination unit to illuminate a corresponding printed-character unit, of the plurality of printed-character units, on which an operation function for the electrical instrument corresponding to the selected name is printed. Therefore, only the printed-character unit is bright, and thus the electrical instrument can be easily operated.

In a preferable embodiment of the present invention, each printed-character unit includes: a white print unit subjected to white printing; a color print unit stacked on an upper portion of the white print unit and subjected to color printing; and a pattern print unit stacked on the upper portion of the color print unit and having a pattern obtained by black-silk printing.

According to this aspect, each printed-character unit is constituted by a white print unit subjected to white printing, a color print unit stacked on an upper portion of the white print unit and subjected to color printing, and a pattern print unit stacked on the color print unit and having a pattern formed by black-silk printing. Accordingly, when the printed-character unit is not illuminated, it is rarely recognized that characters are printed. Therefore, the visibility of the printed-characters becomes preferable.

In a preferable embodiment of the present invention, the direction key includes: a switch pad on which the plurality of printed-character units are formed; a plurality of light-guide units, arranged below the switch pad and respectively formed for the plurality of printed-character units, each light-guide unit guiding light from a corresponding illumination unit to a corresponding printed-character unit; a plurality of switches, arranged below the switch pad and respectively formed for the plurality of printed-character units, and when one of the plurality of printed-character units illuminated by the plurality of illumination units is pressed, a switch corresponding to the pressed printed-character unit being turned on; and a substrate on which the plurality of switches, the plurality of illumination units, and the plurality of light-guide units are integrally packaged.

According to this aspect, since the plurality of light-guide units respectively formed for the plurality of printed-character units guide light from the plurality of illumination units to the plurality of printed-character units, the printed-character units are bright. In addition, when a printed-character unit illuminated by an illumination unit is pressed, a switch corresponding to the pressed printed-character unit is turned on. Accordingly, a signal is output from the switch to the substrate.

In a preferable embodiment of the present invention, the direction key includes: a switch pad on which the plurality of printed-character units and a plurality of light-guide units respectively formed for the plurality of printed-character units, each light-guide unit guiding light from a corresponding illumination unit to a corresponding printed-character unit; a plurality of switches, arranged below the switch pad and respectively formed for the plurality of printed-character units, and when one of the plurality of printed-character units illuminated by the plurality of illumination units is pressed, a switch corresponding to the pressed printed-character unit being turned on; a first substrate on which the plurality of switches are packaged; and a second substrate on which the plurality of illumination units are packaged, wherein there is formed, on the switch pad, a substrate holding unit for holding the second substrate on which the plurality of illumination units are packaged, to keep the second substrate tightly contacting with the plurality of light-guide units formed on the switch pad.

According to this aspect, since the plurality of light-guide units respectively formed for the plurality of printed-character units guide the light from the plurality of illumination units to the plurality of printed-character units, the printed-character units are bright. When the printed-character unit illuminated by the illumination unit is pressed, the switch corresponding to the pressed printed-character unit is turned on. Accordingly, a signal from the switch is output to the first substrate. In addition, since there is formed, on the switch pad, a substrate holding unit for holding the second substrate on which the plurality of illumination units are packaged, to keep the second substrate tightly contacting with the plurality of light-guide units formed on the switch pad, the light-guide units and the second substrate are tightly connected to each other by the substrate holding unit. For this reason, even if the switch pad is operated to move, no light leaks from the illumination units because the switch pad and the second substrate move together with each other.

In a preferable embodiment of the present invention, the direction key includes: a switch pad on which the plurality of printed-character units and a plurality of light-guide units respectively formed for the plurality of printed-character units, each light-guide unit guiding light from a corresponding illumination unit to a corresponding printed-character unit; a second substrate having the plurality of illumination units packaged on a surface thereof and having a plurality of switches packaged on another surface thereof, arranged below the switch pad and respectively formed for the plurality of printed-character units, and when one of the plurality of printed-character units illuminated by the plurality of illumination units is pressed, a switch corresponding to the pressed printed-character unit being turned on; and a first substrate with which the plurality of switches are brought into contact, wherein there is formed, on the switch pad, a substrate holding unit for holding the second substrate on which the plurality of illumination units and the plurality of switches are packaged, to keep the second substrate tightly contacting with the plurality of light-guide units formed on the switch pad.

According to this aspect, since the plurality of light-guide units respectively formed for the plurality of printed-character units guide the light from the plurality of illumination units to the plurality of printed-character units, the printed-character units are bright. When the printed-character unit illuminated by the illumination unit is pressed, the switch corresponding to the pressed printed-character unit is turned on. Accordingly, a signal from the switch is output to the first substrate. In addition, since there is formed, on the switch pad, a substrate holding unit for holding the second substrate on which the plurality of illumination units are packaged, to keep the second substrate tightly contacting with the plurality of light-guide units formed on the switch pad, the light-guide units and the second substrate are tightly connected to each other by the substrate holding unit. For this reason, even if the switch pad is operated to move, no light leaks from the illumination units because the switch pad and the second substrate move together with each other. Furthermore, since the plurality of switches are packaged on the second substrate, a reduction in size can be achieved.

In a preferable embodiment of the present invention, an apparatus for operating instruments for a vehicle further includes a printed-character display key for, when a name of an electrical instrument is selected by the mode selection means, performing designation for displaying, on the screen, printed-character contents of a printed-character unit, of the plurality of printed-character units, for printing an operation function of an electrical instrument corresponding to the selected name, wherein, when the printed-character key is pressed, the display control means displays, on the screen, the printed-character contents of the printed-character unit for printing the operation function of the electrical instrument corresponding to the selected name.

According to this aspect, when a name of an electrical instrument is selected by the mode selection means, the printed-character display key performs designation for displaying, on the screen, printed-character contents of a printed-character unit, of the plurality printed-character units, for printing the operation function of the electrical instrument corresponding to the selected name. At the time, the display control means displays, on the screen, the printed-character contents of the printed-character unit for printing the operation function of the electrical instrument corresponding to the selected name. Therefore, an operator can operate the electrical instrument while watching the printed-character contents, and operability can be improved.

In a preferable embodiment of the present invention, the plurality of electrical instruments includes a plurality of audio/visual instruments and a plurality of information processing instruments, and the mode selection means includes:

AV mode selection means for selecting one of names of the plurality of audio/visual instruments displayed on a screen of the display means; and information mode selection means for selecting one of names of the plurality of information processing instruments displayed on the screen of the display means.

According to this aspect, the AV mode selection means selects one of names of the plurality of audio/visual instruments displayed on a screen of the display means, and information mode selection means selects one of names of the plurality of information processing instruments displayed on the screen of the display means. Therefore, even when the electrical instruments increase in number, a time taken to select an electrical instrument can be shortened.

In a preferable embodiment of the present invention, an apparatus for operating instruments for a vehicle further includes a first illumination unit for illuminating the AV mode selection means; a second illumination unit for illuminating the information mode selection means; and illumination control means for operating the first illumination unit when the AV mode selection means is operated and operating the second illumination unit when the information mode selection means is operated.

According to this aspect, since operated means out of the AV mode selection means and the information mode selection means is illuminated, an operator easily understands which instruments he/she can select of the audio/visual instruments and the information processing instruments.

In a preferable embodiment of the present invention, an apparatus for operating instruments for a vehicle further includes discrimination control means for detecting and discriminating the plurality of electrical instruments connected to the bus.

According to this aspect, since the discrimination control means can detect and discriminate the electrical instruments connected to the bus, even if an electrical instrument is additionally connected to the bus, the present invention can automatically cope with the additional electrical instrument.

The nature, principle and utility of the invention will become more apparent from the following detailed description when read in conjunction with the accompanying drawings.

DESCRIPTION OF THE PREFERRED EMBODIMENTS

Embodiments of an apparatus for operating instruments for a vehicle according to the present invention will be described below with reference to the drawings.

<First Embodiment>

Figure 1:
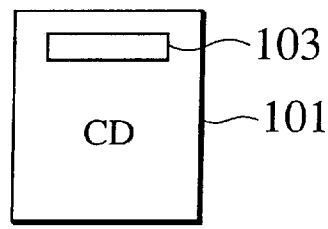
FIG. 1 is a plan view showing an example wherein one function is allocated to one switch.
Figure 2:
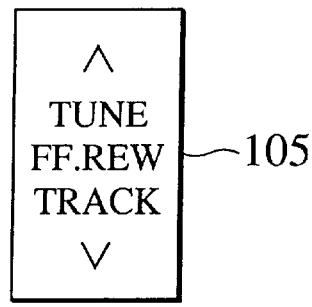
FIG. 2 is a plan view showing an example wherein a plurality of functions are allocated to one switch.
Figure 3:
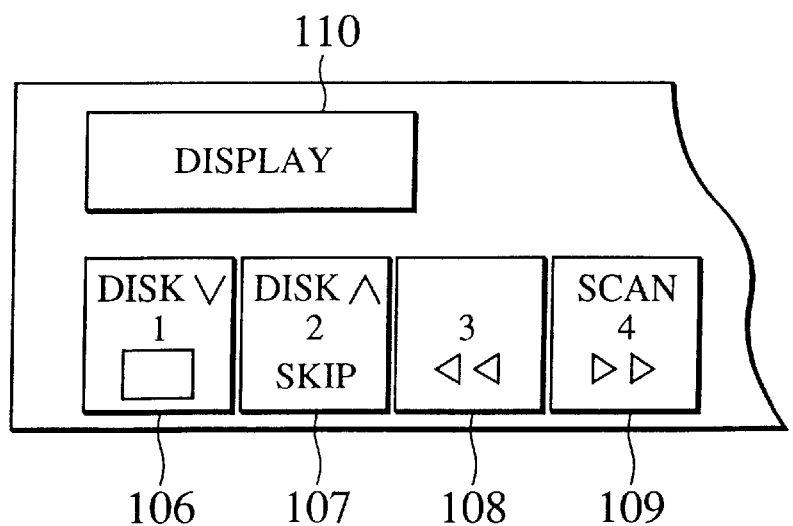
FIG. 3 is a plan view showing another example wherein a plurality of functions are allocated to one switch.
Figure 4:
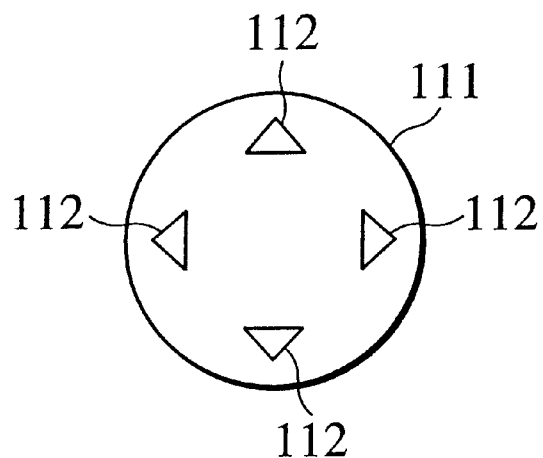
FIG. 4 is a plan view showing a conventional direction key.
Figure 5:
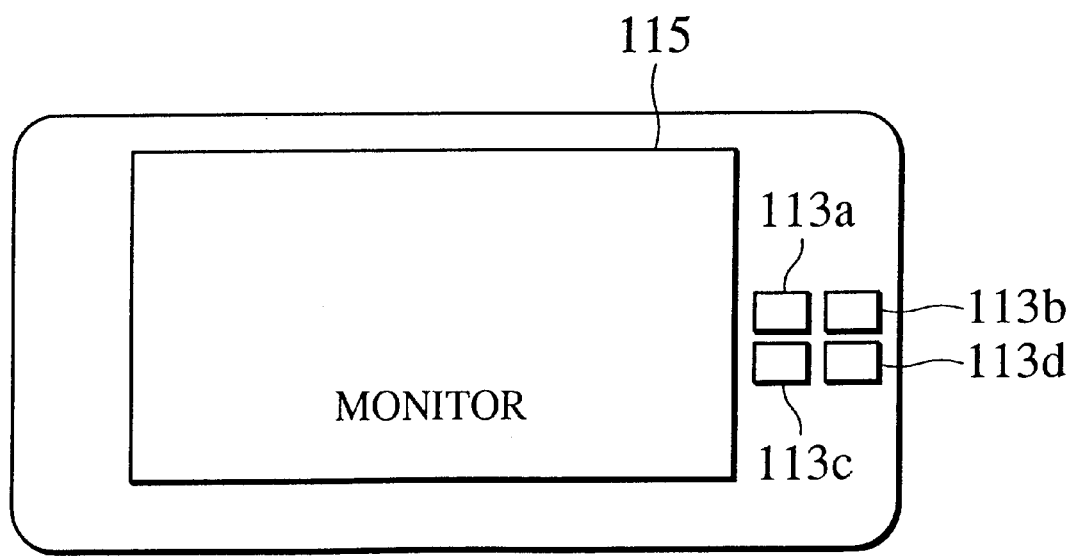
FIG. 5 is a plan view showing an example wherein a plurality of operation switches are formed for a plurality of instruments in a one-to-one correspondence.
Figure 6:
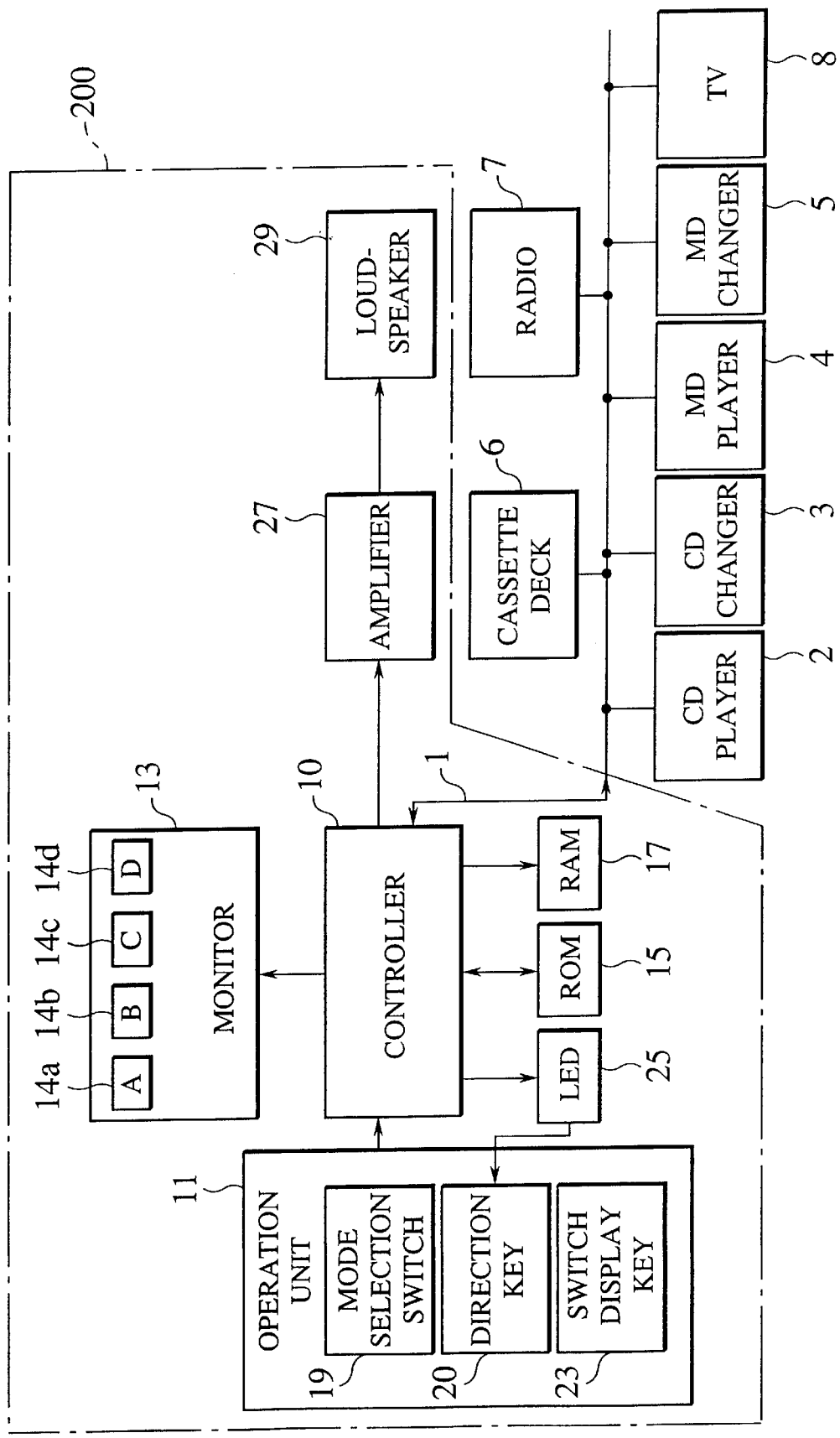
FIG. 6 is a block diagram of the configuration of an apparatus for operating instruments for a vehicle according to the first embodiment of the present invention.

FIG. 6 shows the configuration of an apparatus for operating instruments for a vehicle according to the first embodiment of the present invention. An apparatus 200 for operating instruments for a vehicle according to the present invention is connected to a bus 1. To the bus 1, electrical instruments (to be referred to as instruments hereinafter), i.e., a CD player 2, a CD changer 3, an MD player 4, an MD changer 5, a cassette deck 6, a radio 7, and a television (TV) 8 are connected.

The apparatus 200 for operating instruments for a vehicle selects one instrument of the plurality of instruments connected to the bus 1 to operate the selected instrument. The apparatus 200 for operating instruments for a vehicle is constituted by a controller 10, an operation unit 11, a monitor 13, a read-only memory (ROM) 15, a random-access memory (RAM) 17, a light-emission diode (LED) 25 serving as an illumination unit, an amplifier 27, and a loudspeaker 29.

The operation unit 11 has a mode selection switch 19 serving as a mode selection means, a direction key 20 serving as an instrument operation means, and a switch display key 23. When the instrument names of the plurality of instruments connected to the bus 1 are displayed in a plurality of screen regions on the screen of the monitor 13 in a one-to-one correspondence, the mode selection switch 19 selectively designates one instrument name of the plurality of instrument name. The mode selection switch 19 outputs an instrument selection designation signal depending on a count of press operation on the switch to the controller 10.

The direction key 20 is constituted by a joy stick and obtained by making a switch pad flat. In addition to the functions of direction designation (navigation or scroll), cursor moving (menu operation), and fixing (execution), operations for the cassette deck 6 (TAPE), the radio 7 (RADIO), the TV 8, the CD player 2, the CD changer 3, the MD player 4, and the MD changer 5 are allocated to the direction key 20. The details of the direction key 20 will be described later.

The switch display key 23 outputs an allocation display designation signal to the controller 10, the signal being used for displaying the allocation contents of the function of the selected instrument for the switch pad of the direction key 20 on the screen of the monitor 13.

The controller 10 serving as a display control means displays the instrument names of the plurality of instruments connected to the bus 1 in the plurality of screen regions on the screen of the monitor 13 in a one-to-one correspondence. The controller 10 performs reversing display of a screen region corresponding to an instrument selection designation signal on the screen of the monitor 13 on the basis of the instrument selection designation signal from the mode selection switch 19.

When an instrument name is selected by the mode selection switch 19, the controller 10 serving as an illumination control means allocates a function to the direction key 20 depending on an instrument corresponding to the selected instrument name to light the LED 25 on, and thus a printed-character of the direction key 20 related to the selected instrument is illuminated.

The controller 10 outputs an instrument operation signal to the amplifier 27, the signal depending on operation designation of the direction key 20 corresponding to the selected instrument. The controller 10 displays allocation contents representing a function allocated to the selected instrument on the screen of the monitor 13 on the basis of an allocation display designation signal from the switch display key 23.

The ROM 15 stores a program for operating the controller 10. The RAM 17 stores data required to operate the controller 10. The LED 25 illuminates the printed-character of the direction key 20. The amplifier 27 amplifies the instrument operation signal transmitted from the controller 10 to output the amplified signal to the loudspeaker 29.

Figure 8:
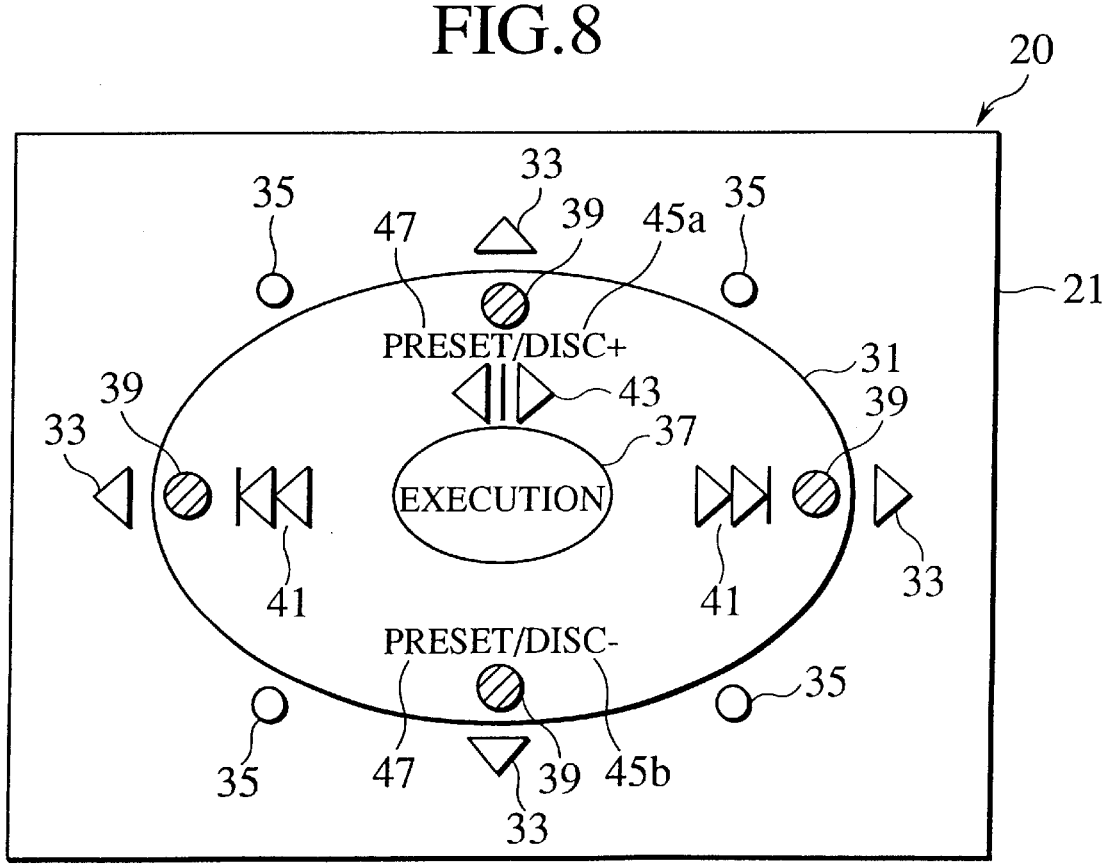
FIG. 8 is a plan view of the details of a direction key, to which all functions are allocated, according to the first embodiment.

Next, the allocation contents of the functions of the direction key 20 will be described below. FIG. 8 shows the direction key to which all the functions are allocated. In FIG. 8, the direction key 20 has a square-shaped switch panel 21, an elliptical switch pad 31, and an elliptical execution key 37 arranged at the central portion of the switch pad 31.

On the switch panel 21, there are formed vertical/horizontal direction designation units 33 (four positions) and oblique direction designation units 35 (four positions) for designating eight directions. On the switch pad 31, four almost-semispherical projections 39 are formed at the portions opposing the vertical/horizontal direction designation units 33 of the switch panel 21. Printed characters 41 for representing AMS/(FF/REW) are formed inside the projections 39 in the horizontal directions.

Printed characters 43 for representing a switching operation of running directions of the TAPE are formed between the upper projection 39 and the execution key 37 on the switch pad 31. Printed characters 45a for representing a change (DISC+) of CDs or MDs are formed between the upper projection 39 and the execution key 37, and printed-characters 45b for representing a change (DISC-) of CDs or MDs are formed between the lower projection 39 and the execution key 37, on the switch pad 31. Printed characters 47 for representing presetting operations (PRESET +/-) for the radio 7 and the TV 8 are formed on the left sides of the printed-characters 45a and the printed-characters 45b.

Figure 9:
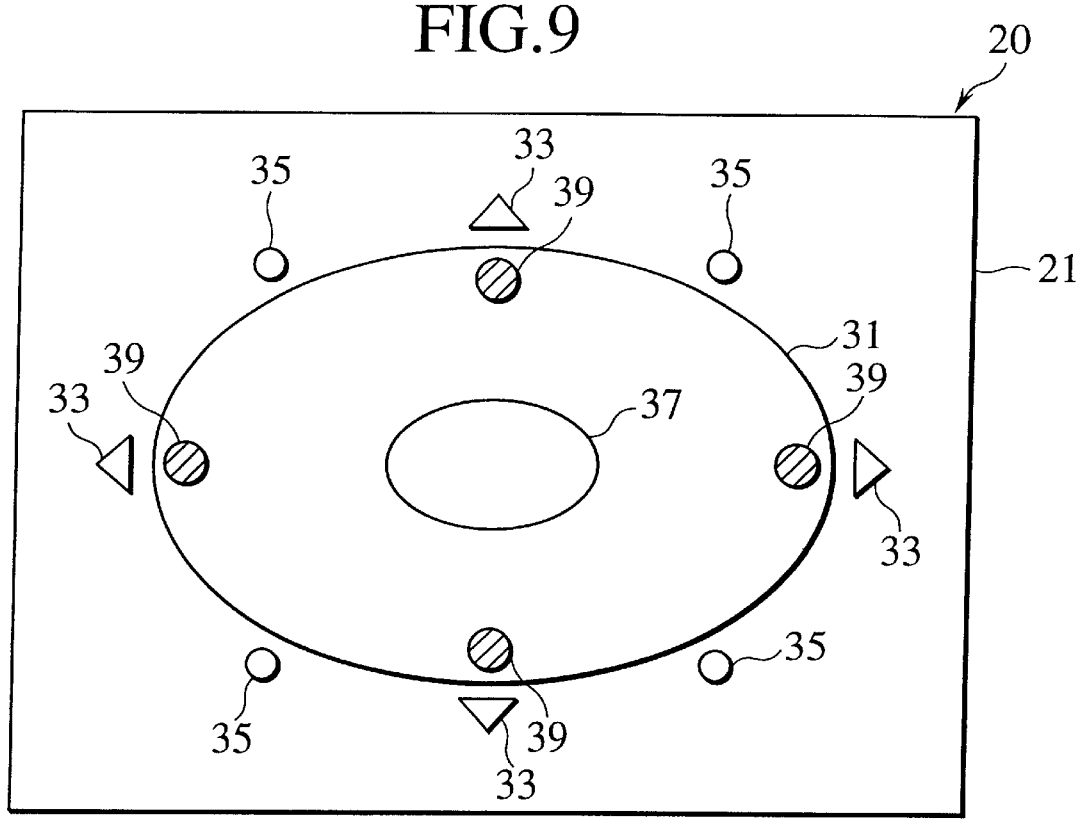
FIG. 9 is a plan view showing an example wherein a function of direction designation is allocated to the direction key.

FIG. 9 shows an example wherein a function of direction designation is allocated to the direction key. When the direction key 20 is used in a navigation system, as shown in FIG. 9, one of the eight directions is designated by the vertical/horizontal direction designation units 33 and the oblique direction designation units 35 for designating eight directions and the four projections 39.

Figure 10:
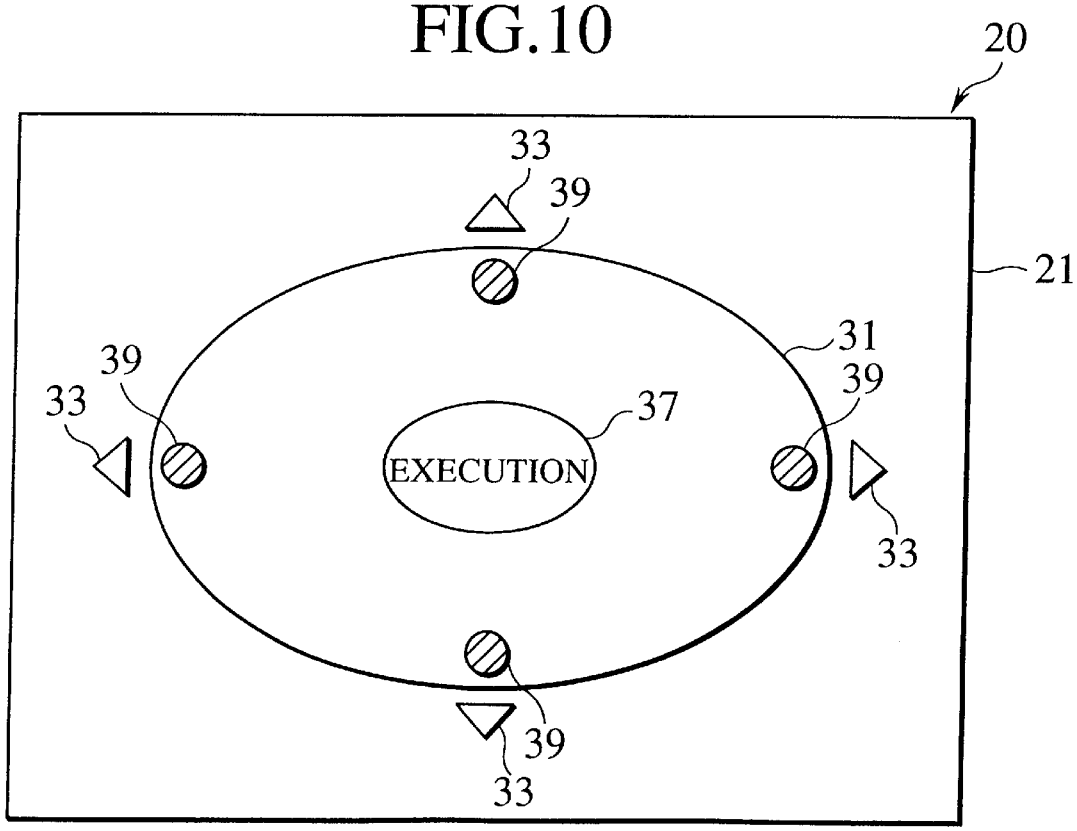
FIG. 10 is a plan view showing an example wherein a cursor operation and a function of execution are allocated to the direction key.

FIG. 10 shows an example wherein a cursor operation and a function of execution are allocated to the direction key. Since the cursor operation on the screen is performed in four vertical and horizontal directions, the vertical/horizontal direction designation units 33 and the projections 39 are used. The execution key 37 is used to execute the cursor operation.

Figure 11:
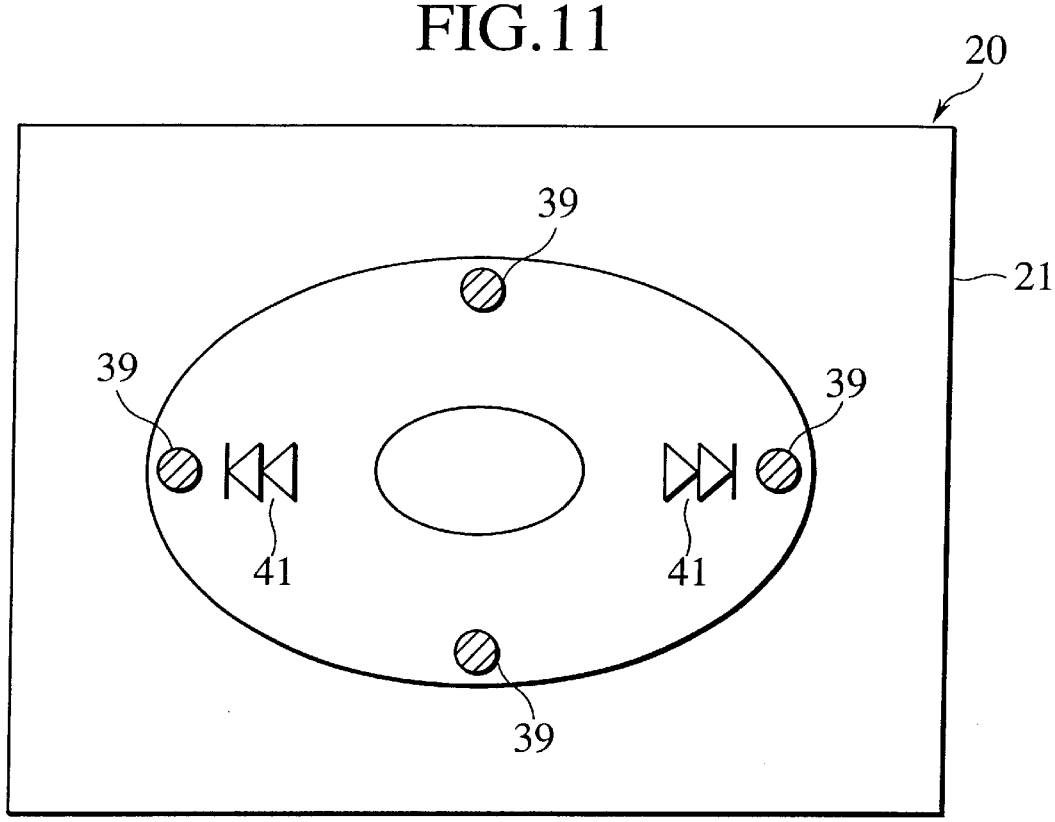
FIG. 11 is a plan view showing an example wherein a function of a CD player or an MD player is allocated to the direction key.

FIG. 11 shows an example wherein a function of a CD player or an MD player is allocated to the direction key. When the CD player 2 or the MD player 4 is selected by the mode selection switch 19, as shown in FIG. 11, the printed-characters 41 for representing AMS/(FF/REW) for the CD player 2 or the MD player 4 are displayed.

Figure 12:
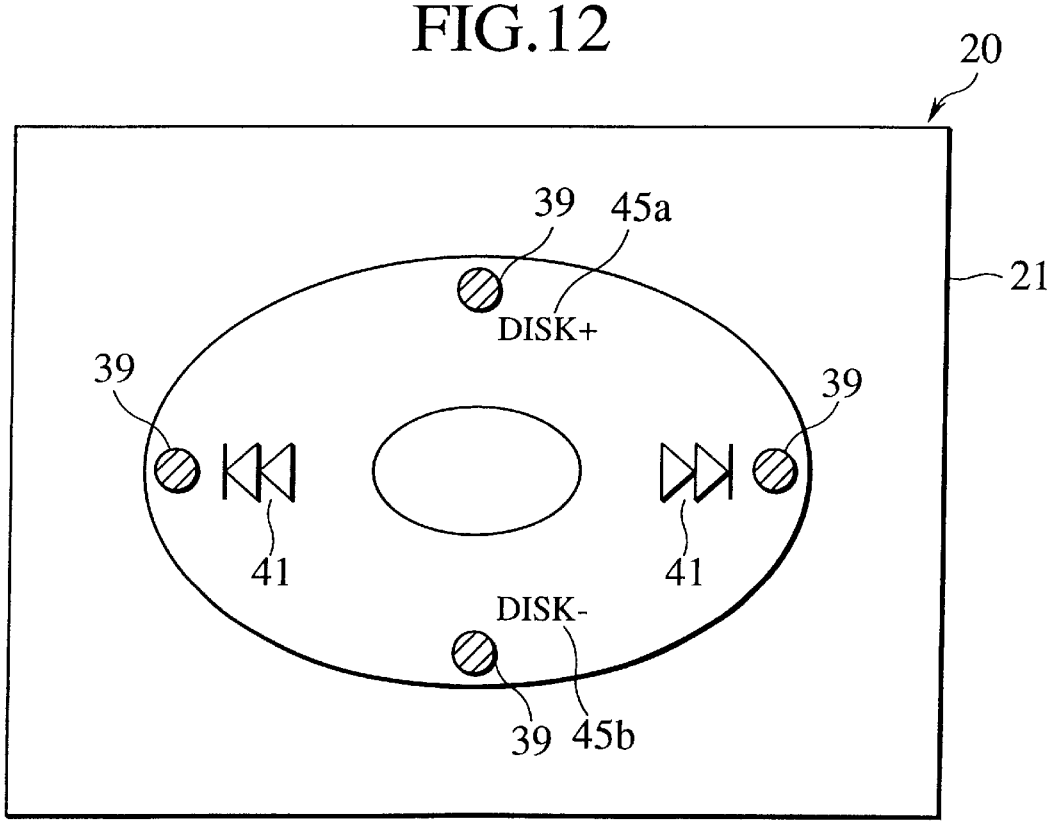
FIG. 12 is a plan view showing an example wherein a function of a CD changer or an MD changer is allocated to the direction key.

FIG. 12 shows an example wherein a function of a CD changer or an MD changer is allocated to the direction key. When the CD changer 3 or the MD changer 5 is selected by the mode selection switch 19, as shown in FIG. 12, the printed-characters 41 for representing AMS/(FF/REW) for the CD changer 3 or the MD changer 5 are displayed. In addition, the printed-characters 45a and 45b for representing a change (DISC +/-) of the CDs or the MDs are displayed.

Figure 13:
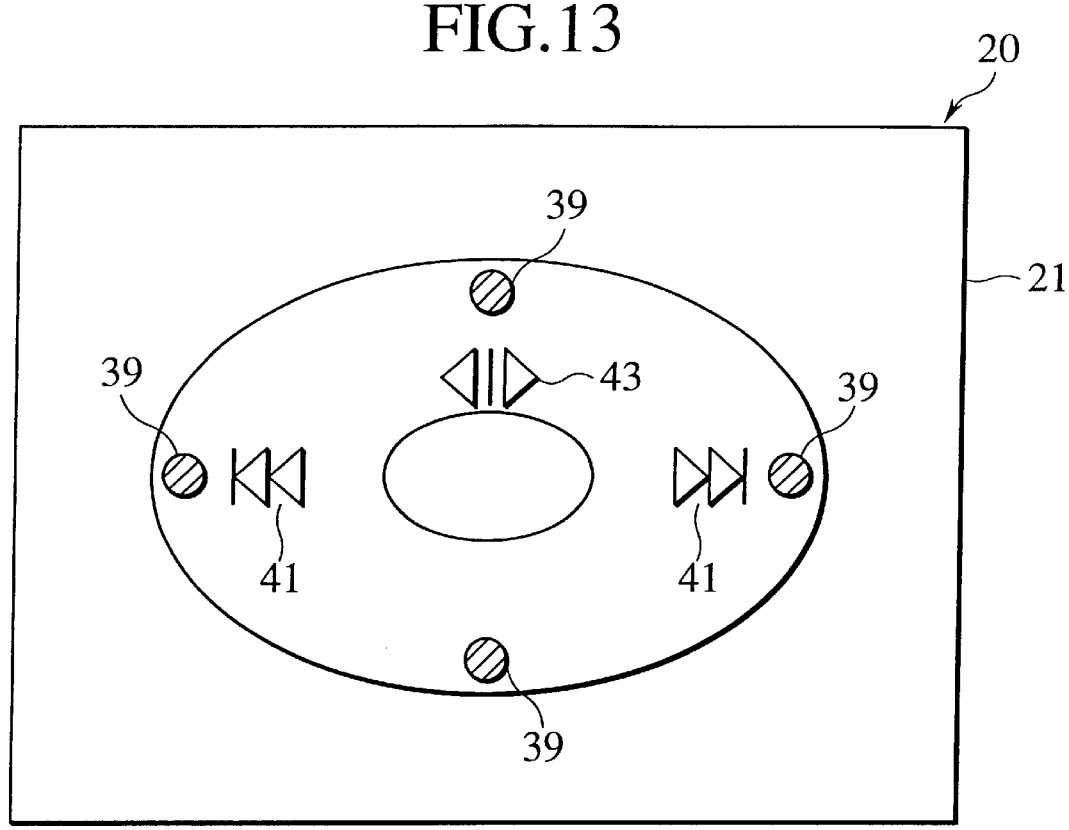
FIG. 13 is a plan view showing an example wherein a function of a TAPE is allocated to the direction key.

FIG. 13 shows an example wherein a function of a TAPE is allocated to the direction key. When the cassette deck (TAPE) 6 is selected by the mode selection switch 19, as shown in FIG. 13, the printed-characters 41 for representing AMS/(FF/REW) for the TAPE are displayed, and the printed-characters 43 for representing a running direction switching operation for the TAPE are displayed.

Figure 14:
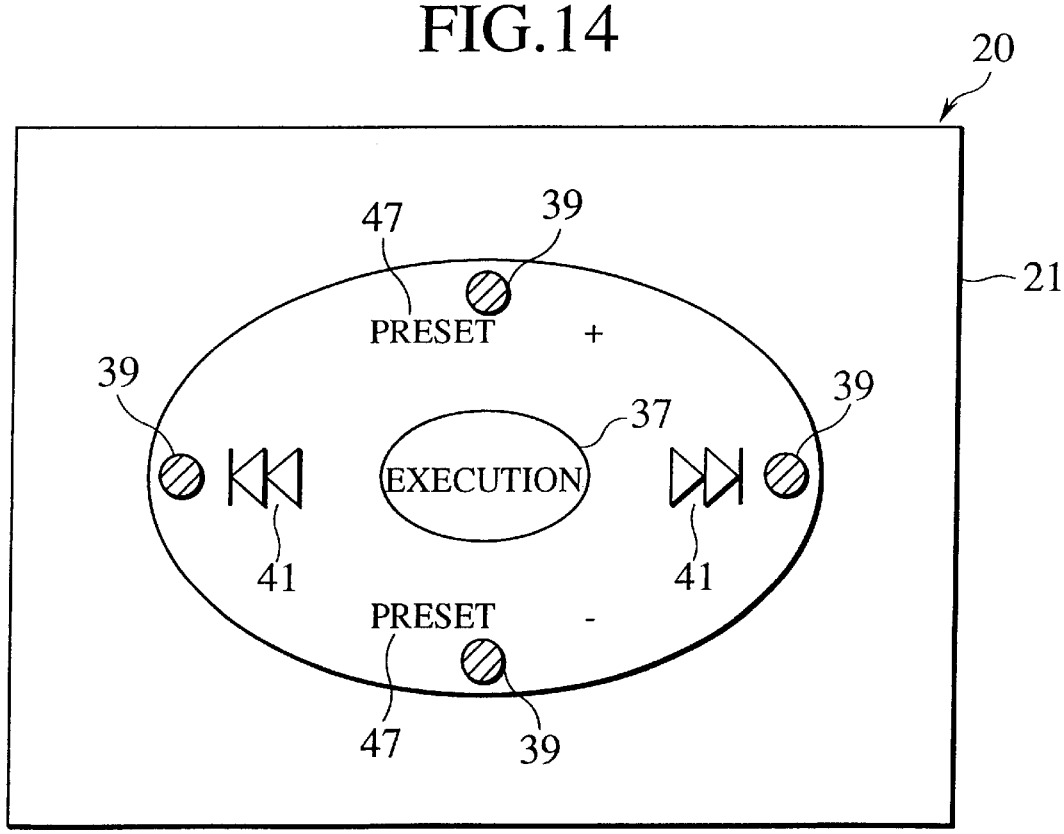
FIG. 14 is a plan view showing an example wherein a function of a radio or a television is allocated to the direction key.

FIG. 14 shows an example wherein a function of a radio or a TV is allocated to the direction key. When the radio 7 or the TV 8 is selected by the mode selection switch 19, as shown in FIG. 14, the printed-characters 41 for representing AMS/(FF/REW) for the radio 7 or the TV 8 are displayed. In addition, the printed-characters 47 for representing PRE-SET (+/−) for the radio 7 or the TV 8 are displayed, and the execution key 37 for executing a presetting operation is displayed.

Figure 15:
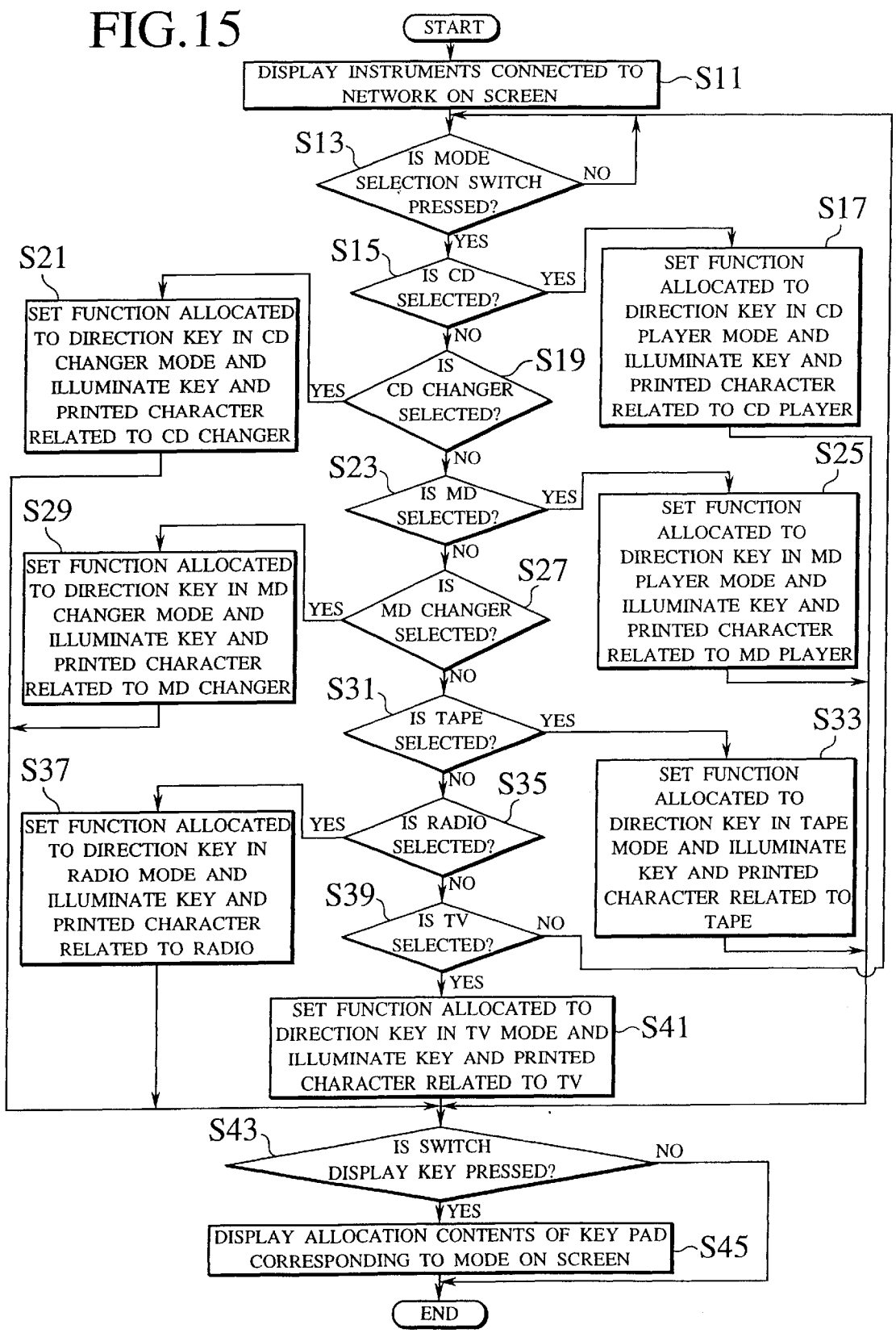
FIG. 15 is a flow chart showing an operation of a controller formed in the apparatus for operating instruments for a vehicle according to the first embodiment.

An operation of the controller formed in the apparatus for operating instruments for a vehicle according to the first embodiment arranged as described above will be described below with reference to the flow chart in FIG. 15. The controller 10 checks whether the instruments, i.e., the CD player 2, the CD changer 3, the MD player 4, the MD changer 5, the cassette deck 6, the radio 7, and the TV 8 are connected to the bus 1.

In this case, when a control signal is transmitted from the controller 10 to each of the instruments, and a response signal corresponding to the control signal is returned from the instrument to the controller 10, it is determined that the instrument is connected to the bus 1.

If the controller 10 determines that the instruments are connected to the bus 1, the controller 10 displays the instruments connected to the bus 1 in the screen regions on the screen of the monitor 13 (step S11). For example, a "CD player" is displayed as an instrument name in an A screen region 14a, a "CD changer" is displayed in a B screen region 14b, an "MD player" is displayed in a C screen region 14c, and an "MD changer" is displayed in a D screen region 14d.

Figure 7:
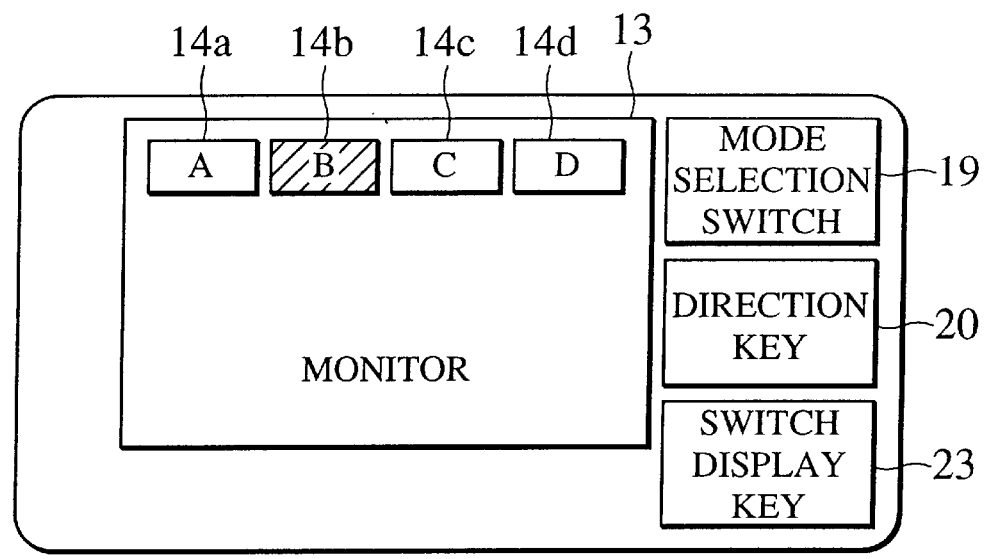
FIG. 7 is a plan view showing a state in which an instrument on a screen is selected by a mode selection switch when instruments connected to a bus are displayed on the screen.

On the screen shown in FIG. 7, only the A screen region 14a to the D screen region 14d are displayed. However, the screen regions corresponding to the instruments of the cassette deck 6, the radio 7, and the TV 8 are actually set on the screen, a "cassette deck", a "radio", and a "TV" are displayed in the screen regions, respectively.

Next, it is checked whether the mode selection switch 19 is pressed (step S13). If the mode selection switch 19 is pressed, it is checked whether the CD player 2 is selected (step S15).

When the mode selection switch 19 is pressed once, it is determined that the CD player 2 is selected, and the A screen region 14a, in which "CD player" is displayed, on the screen of the monitor 13 is subjected to reversing display. In this manner, an operator can recognize that he/she has selected the CD player 2.

A function allocated to the direction key 20 is set to be a CD player mode to light the LED 25 on, thereby illuminating the printed-characters, related to the CD player 2, of the direction key 20 (step S17). More specifically, since display of printed-characters is performed on the direction key 20 as shown in FIG. 11, the operations of AMS/FF/REW for the CD player 2 can be performed according to the display of printed-characters.

Next, it is checked whether the CD changer 3 is selected (step S19). When the mode selection switch 19 is pressed twice, it is determined that the CD changer 3 is selected, and the B screen region 14b, on which a "CD changer" is displayed, on the screen of the monitor 13 is subjected to reversing display. For example, as shown in FIG. 7, the B screen region 14b is subjected to reversing display (indicated by an oblique line in FIG. 7). In this manner, an operator can recognize that he/she has selected the CD changer 3.

A function allocated to the direction key 20 is set to be a CD changer mode to light the LED 25 on, thereby illuminating the printed-characters, related to the CD changer 3, of the direction key 20 (step S21). More specifically, since display of printed-characters is performed on the direction key 20 as shown in FIG. 12, the operations of AMS/FF/REW and DISC (+/−) for the CD changer 3 can be performed according to the display of printed-characters.

Then, it is checked whether the MD player 4 is selected (step S23). If the mode selection switch 19 is pressed three times, it is determined that the MD player 4 is selected, and the C screen region 14c, on which an "MD player" is displayed, on the screen of the monitor 13 is subjected to reversing display. In this manner, an operator can recognize that he/she has selected the MD player 4.

A function allocated to the direction key 20 is set to be an MD player mode to light the LED 25 on, thereby illuminating the printed-characters, related to the MD player 4, of the direction key 20 (step S25). More specifically, since display of printed-characters is performed on the direction key 20 as shown in FIG. 11, the operations of AMS/FF/REW for the MD player 4 can be performed according to the display of printed-characters. Therefore, the operation for the MD player 4 can be performed by the same functional key as that used in the operation for the CD player 2.

Next, it is checked whether the MD changer 5 is selected (step S27). When the mode selection switch 19 is pressed four times, it is determined that the MD changer 5 is selected, and the D screen region 14d, on which an "MD changer" is displayed, on the screen of the monitor 13 is subjected to reversing display. In this manner, an operator can recognize that he/she has selected the MD changer 5.

A function allocated to the direction key 20 is set to be an MD changer mode to light the LED 25 on, thereby illuminating the printed-characters, related to the MD changer 5, of the direction key 20 (step S29). More specifically, since display of printed-characters is performed on the direction key 20 as shown in FIG. 12, the operations of AMS/FF/REW and DISC (+/−) for the MD changer 5 can be performed according to the display of printed-characters. Therefore, the operation for the MD changer 5 can be performed by the same functional key as that used in the operation for the CD changer 3.

Then, it is checked whether the cassette deck (TAPE) 6 is selected (step S31). If the mode selection switch 19 is pressed five times, it is determined that the TAPE is selected, and the E screen region, on which a "TAPE" is displayed, on the screen of the monitor 13 is subjected to reversing display (not shown). In this manner, an operator can recognize that he/she has selected the TAPE.

A function allocated to the direction key 20 is set to be a TAPE mode to light the LED 25 on, thereby illuminating the printed-characters, related to the TAPE, of the direction key 20 (step S33). More, specifically, since display of printed-characters is performed on the direction key 20 as shown in FIG. 13, the operations of AMS/FF/REW for the TAPE can be performed according to the display of printed-characters.

It is checked whether the radio (RADIO) 7 is selected (step S35). If the mode selection switch 19 is pressed six times, it is determined that the RADIO 7 is selected, and the F screen region, on which a "RADIO" is displayed, on the screen of the monitor 13 is subjected to reversing display (not shown). In this manner, an operator can recognize that he/she has selected the RADIO 7.

A function allocated to the direction key 20 is set to be a RADIO mode to light the LED 25 on, thereby illuminating the printed-characters, related to the RADIO 7, of the direction key 20 (step S37). More specifically, since display of printed-characters is performed on the direction key 20 as shown in FIG. 14, the operations of SEEK/TUNE (+/−), PRESET (+/−), and PRESET execution for the radio 7 can be performed according to the display of printed-characters.

Next, it is checked whether the TV 8 is selected (step S39). If the mode selection switch 19 is pressed seven times, it is determined that the TV 8 is selected, and the G screen region, on which a "TV" is displayed, on the screen of the monitor 13 is subjected to reversing display (not shown). In this manner, an operator can recognize that he/she has selected the TV 8.

A function allocated to the direction key 20 is set to be a TV mode to light the LED 25 on, thereby illuminating the printed-characters, related to the TV 8, of the direction key 20 (step S41). More specifically, since display of printed-characters is performed on the direction key 20 as shown in FIG. 14, the operations of SEEK/TUNE (+/−), PRESET (+/−), and PRESET execution for the TV 8 can be performed according to the display of printed-characters.

Next, it is checked whether the switch display key 23 is pressed (step S43). When the switch display key 23 is pressed, the allocation contents of a key pad corresponding to a mode are displayed on the screen of the monitor 13 (step S45).

Figure 24:
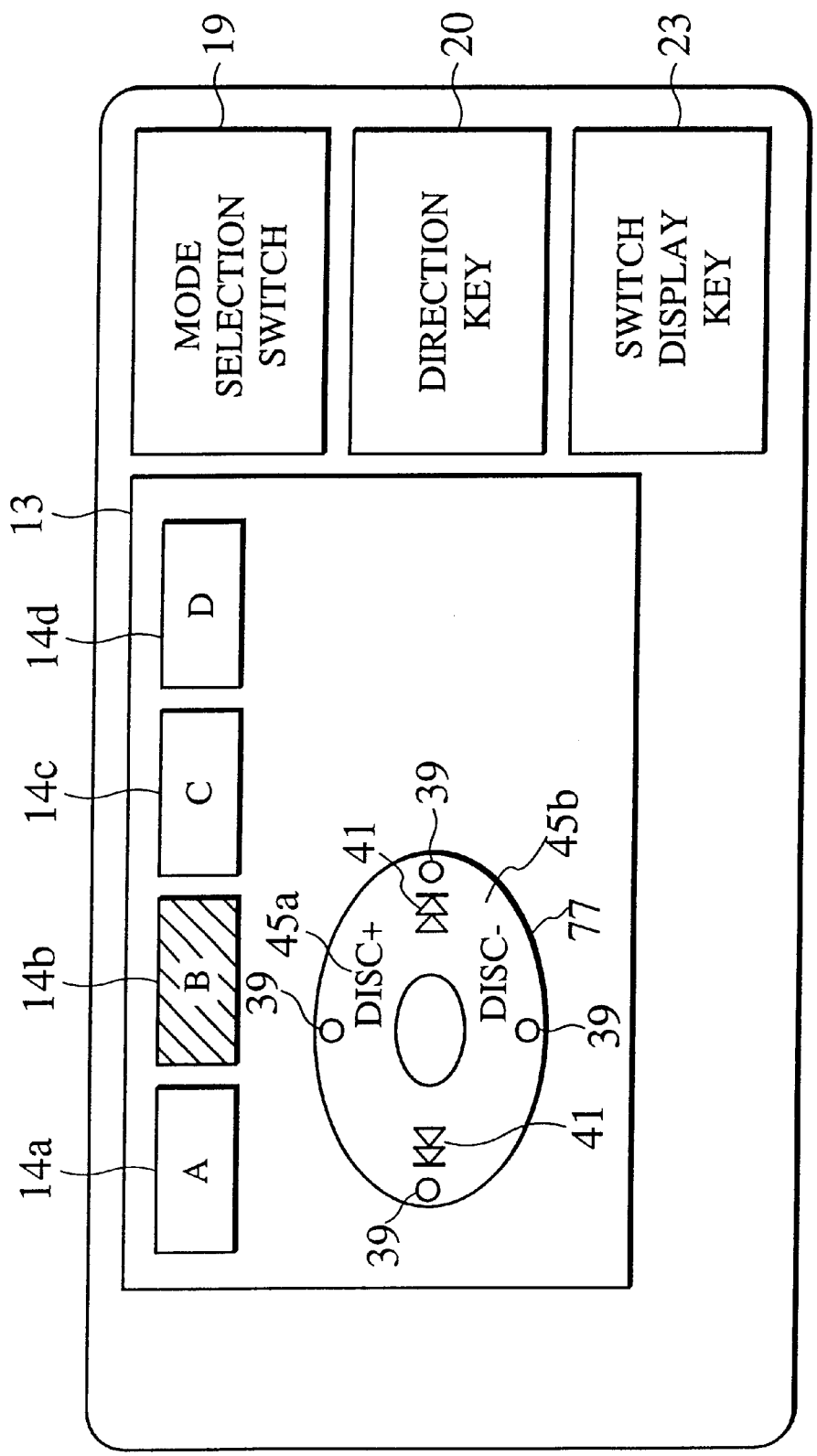
FIG. 24 is a plan view showing a state in which, when a switch display key is pressed, a direction key corresponding to a function mode at the time is displayed on the screen of a monitor.

For example, when the mode is a CD changer mode, as shown in FIG. 24, a key pad 77 on which a function is allocated is displayed on the screen. More specifically, when the switch display key 23 is pressed, a key pad display corresponding to a mode can be provided, so that an operator can perform an operation with reference to the key pad display displayed on the screen.

According to the apparatus for operating instruments for a vehicle of the first embodiment, the names of a plurality of instruments connected to the bus 1 are displayed on the screen, one instrument name of the plurality of instrument names displayed on the screen is selected by the mode selection switch 19, and the selected instrument name is subjected to reversing display.

Namely, only one mode selection switch 19 is required for the plurality of instruments connected to the bus 1, and the device can cope with the extendability of the network.

The functions of the plurality of instruments connected to the bus 1 are allocated to the direction key 20 to integrate switches, and thus the direction key 20 has a plurality of functions. For this reason, the number of switches can be reduced.

<Method of Illuminating Printed Characters of Direction Key>

A method of illuminating the printed-characters of the key pad of the direction key 20 will be described below with reference to the drawings. When the direction key 20 is made multi-functional, printed-characters corresponding to all the functions are made on the key pad. Therefore, in this state, when a certain mode is selected, the types of function modes cannot be discriminated from each other if as they are. For this reason, the printed-characters of a function corresponding to a selected mode are illuminated.

Figure 16:
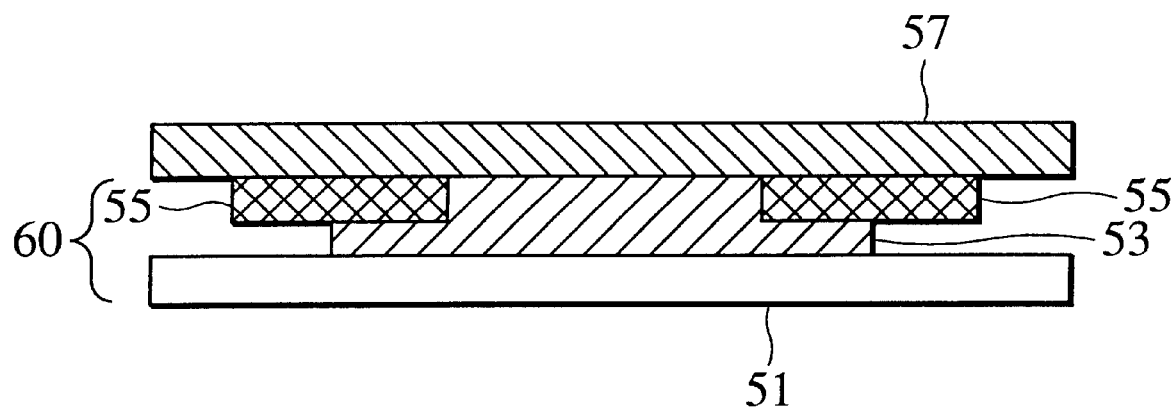
FIG. 16 is a plan view showing the laminate structure of a printed-character unit of a switch pad formed on the direction key.
Figure 17:
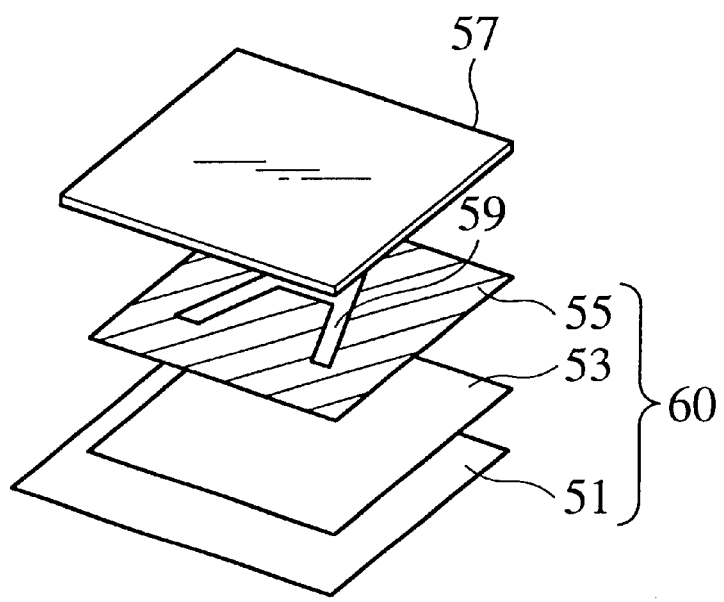
FIG. 17 is a plan view showing the details of the printed-character unit of the switch pad shown in FIG. 16.

The laminate structure of printed-character unit of the switch pad formed on the direction key is shown in FIG. 16. FIG. 17 is a plan view showing the details of the printed-character unit of the switch pad shown in FIG. 16. A large number of printed-characters are incorporated on the switch pad 31 of the direction key 20, and the LEDs 25 described above are arranged on the printed-characters, respectively.

The printed-character unit 60 shown in FIG. 16 is constituted by a white print unit 51, a color print unit 53 stacked on the upper portion of the white print unit 51, and pattern print units 55 stacked on the upper right end and the upper left end of the color print unit 53. A smoke plate 57 is stacked on the upper portion of the printed-character unit 60.

The smoke plate 57 consists of a resin material such as acrylic resin, and mat treatment (non-glare treatment) is performed to the surface of the smoke plate 57. In the pattern print units 55, the pattern is silk-printed in black. In the color print unit 53, color printing is performed in accordance with a color required for printing a character. In the white print unit 51, white printing is performed to diffuse source light from the LED 25.

According to the printed-character unit 60 arranged as described above, when the LED 25 is lit, only a necessary printed-character is illuminated by the LED 25. When the LED 25 is not lit, the pattern is silk-printed in black. For this reason, unnecessary printed-characters are painted black, and thus a switch pad in which printed-character units can be rarely recognized can be provided.

Figure 18:
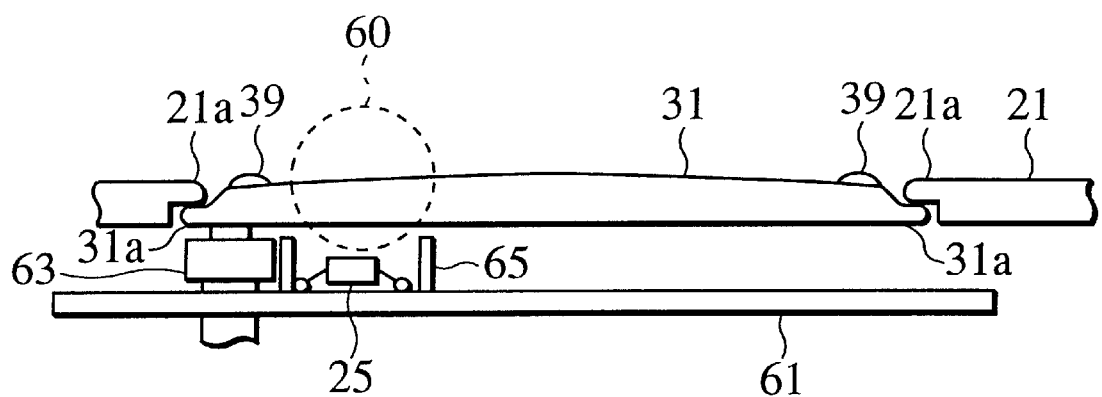
FIG. 18 is a sectional view showing the structure of the first example of the direction key.
Figure 19:
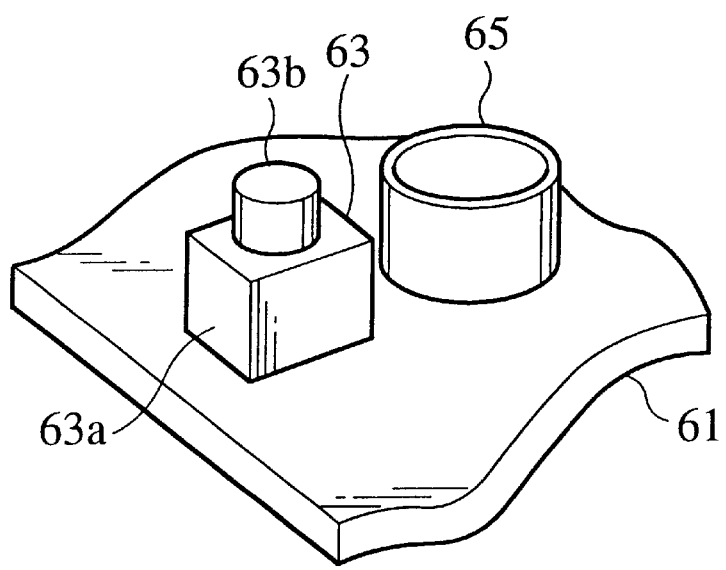
FIG. 19 is a plan view showing a switch and a light-shielding wall formed on the direction key of the first example.

FIG. 18 is a sectional view showing the structure of the first example of the direction key. FIG. 19 shows a switch and a light-shielding wall formed on the direction key of the first example. In the direction key 20 shown in FIG. 18, a peripheral end portion 31a of the switch pad 31 is engaged with a distal end portion 21a of the switch panel 21 in a normal state, and the peripheral end portion 31a of the switch pad 31 can freely move downward in an operation state.

A circuit substrate 61, a switch 63, an LED 25, and a light-shielding wall 65 are arranged below the switch pad 31. On the circuit substrate 61, the switch 63, the LED 25 and the light-shielding wall 65 are packaged.

The switch 63 is arranged at a position opposing a position extending from the peripheral end portion 31a to the projection 39 of the switch pad 31, and is constituted by a switch body 63a and a cylindrical projection 63b arranged on the upper portion of the switch body 63a.

Using the switch 63 as above, when the projections 39 or the printed-character unit 60 of the switch pad 31 is pressed, the cylindrical projection 63b moves downward, and an instrument operation signal can be output to the circuit substrate 61 having the controller 10.

The LED 25 is arranged on the right side of the switch 63, and the LED 25 is surrounded by the cylindrical light-shielding wall 65 to guide light upward. At a position opposing the LED 25 of the switch pad 31, the printed-character unit 60 described above is arranged. Accordingly, the printed-character unit 60 receives light from the LED 25 so that the printed-characters of the printed-character unit 60 are illuminated.

Figure 20:
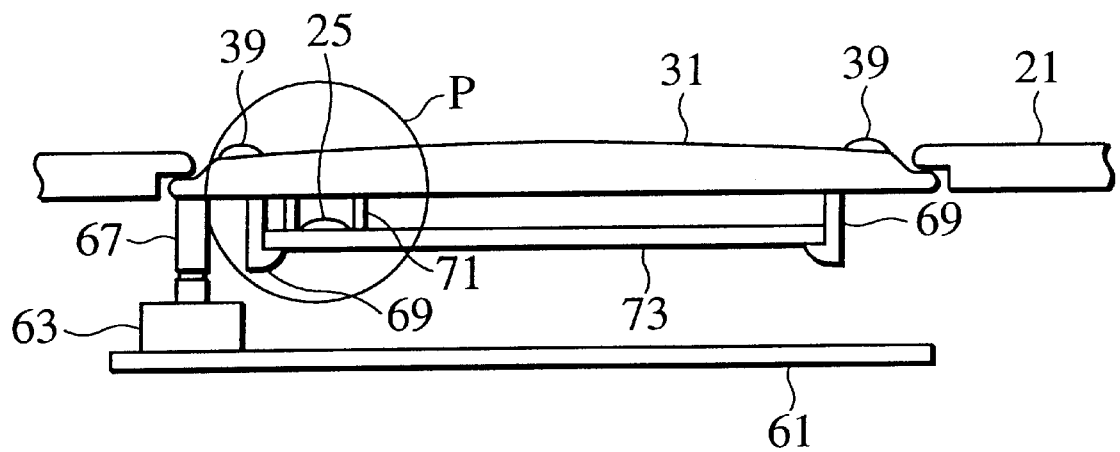
FIG. 20 is a sectional view showing the structure of the second example of the direction key.
Figure 21:
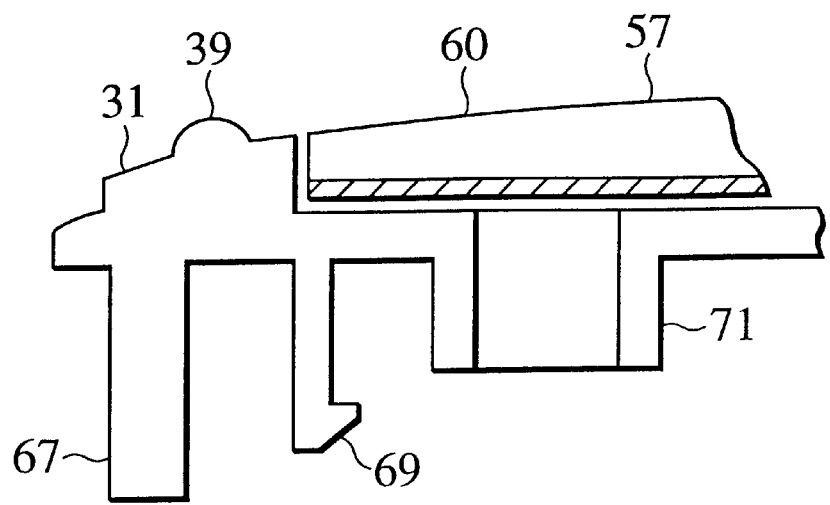
FIG. 21 is a sectional view showing the details of a portion P of the direction key of the second example shown in FIG. 20.
Figure 22:
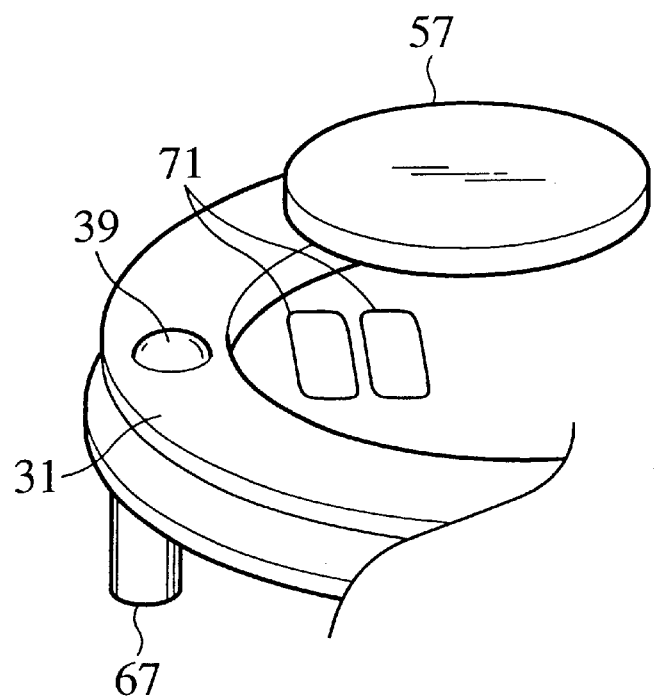
FIG. 22 is a perspective view showing the portion P of the direction key shown in FIG. 21.

The second example of the direction key will be described below. FIG. 20 is a sectional view showing the structure of the second example of the direction key. FIG. 21 is a sectional view showing the details of a portion P of the direction key of the second example shown in FIG. 20. FIG. 22 is a perspective view showing the portion P of the direction key shown in FIG. 21. The direction key of the second example is a direction key obtained by applying a light leakage prevention device to the direction key of the first example.

In FIG. 20, a projecting spacer 67 is formed at the peripheral end portion of the switch pad 31, the switch 63 is arranged below the spacer 67, and the switch 63 is packaged on the circuit substrate 61. Accordingly, when the peripheral end portion of the switch pad 31 is pressed, the switch 63 can be turned on through the spacer 67.

A light-shielding wall 71 which cylindrically projects is formed at a position opposing the printed-character unit 60 of the switch pad 31, and a projecting substrate holding pawl 69 is formed at a portion between the spacer 67 and the light-shielding wall 71 on the switch pad 31. The substrate holding pawl 69 of the switch pad 31 holds a light-source substrate 73 on which the LED 25 is packaged. The light-shielding wall 71 guides light from the LED 25 to the printed-character unit 60.

According to the direction key arranged as described above, the substrate holding pawl 69 and the light-shielding wall 71 are integrated with the switch pad 31. The light-source substrate 73 on which the LED 25 is packaged is filled in the substrate holding pawl 69, so that the light-source substrate 73 is brought into tight contact with the light-shielding wall 71.

Therefore, even if the switch pad 31 is operated to move, the switch pad 31 and the light-source substrate 73 move together with each other. For this reason, no light leaks from the LED 25.

Figure 23:
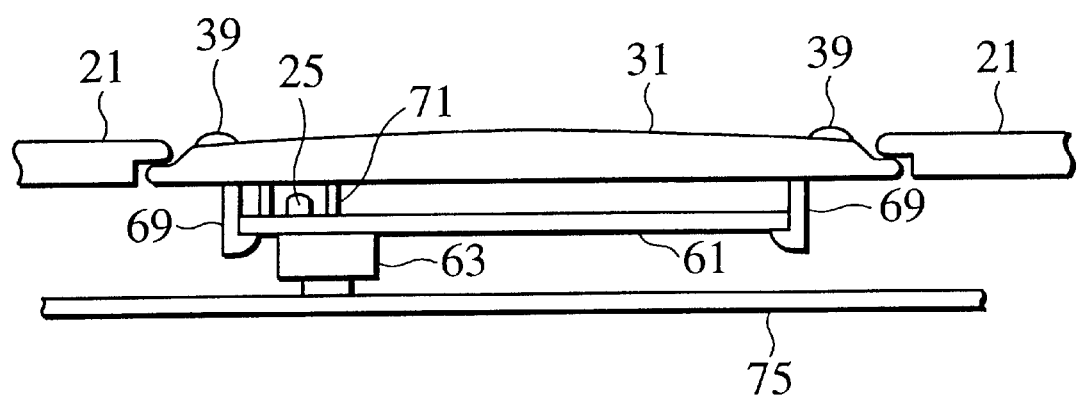
FIG. 23 is a sectional view showing the structure of the third example of the direction key.

Next, the third example of the direction key will be described below. FIG. 23 is a sectional view showing the third example of a direction key. The direction key of the third example shown in FIG. 23 is a direction key obtained by reducing the direction key of the second example shown in FIG. 21 in size.

The substrate holding pawl 69 and the light-shielding wall 71 are formed on the switch pad 31 shown in FIG. 23, and the circuit substrate 61 on which the LED 25 is packaged is held on the switch pad 31 by the substrate holding pawl 69. The switch 63 is arranged below the circuit substrate 61, and the switch 63 is packaged on the circuit substrate 61. The projection of the switch 63 is brought into contact with a case wall 75.

According to the direction key arranged as described above, when the switch pad 31 is operated, the projection of the switch 63 is pressed and thus the switch 63 is turned on. Since the switch 63 is attached to the lower portion of the circuit substrate 61, a reduction in size can be achieved.

<Second Embodiment>

Figure 25:
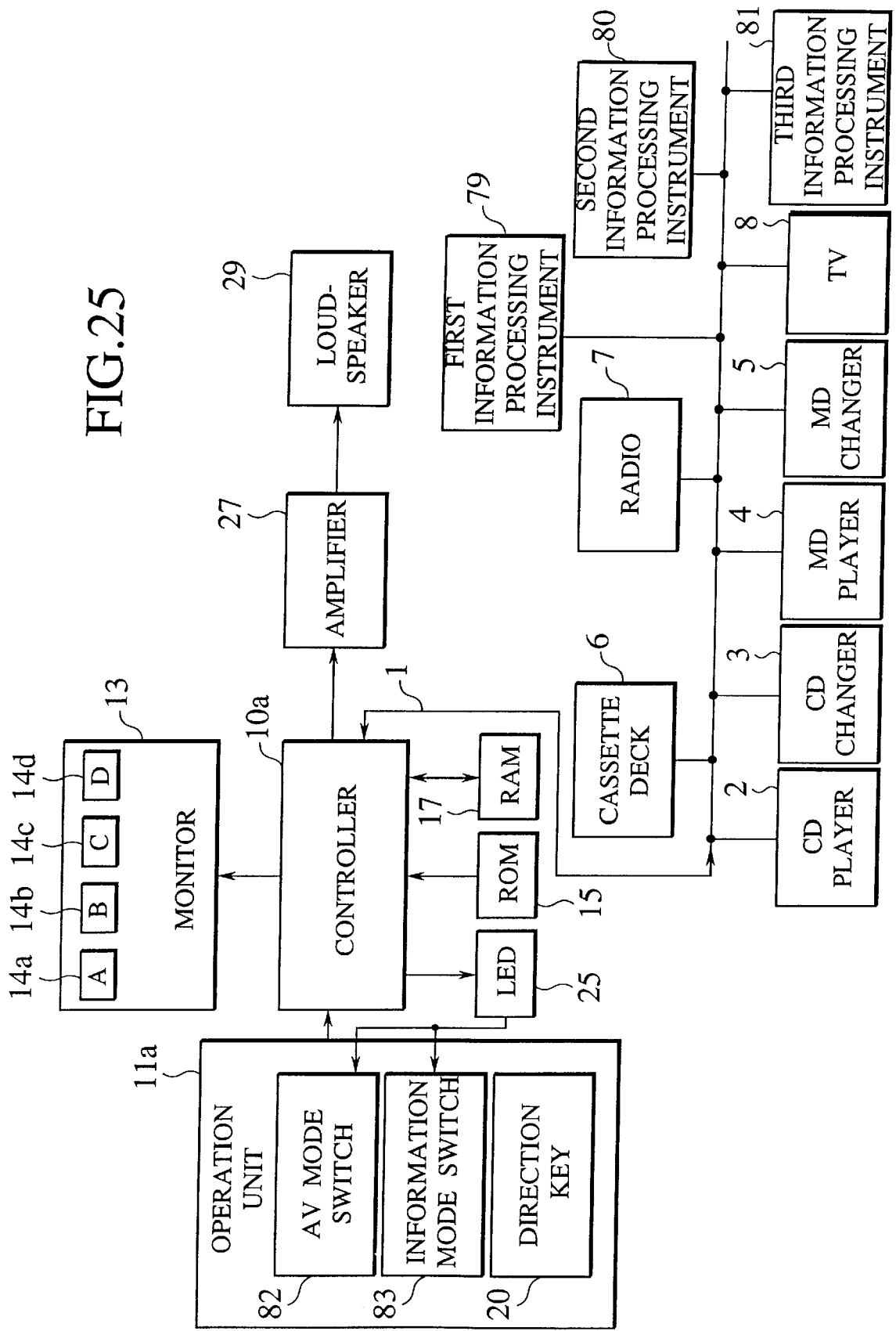
FIG. 25 is a block diagram showing the configuration of an apparatus for operating instruments for a vehicle according to the second embodiment of the present invention.

An apparatus for operating instruments for a vehicle according to the second embodiment of the present invention will be described below. FIG. 25 is a block diagram showing the configuration of the apparatus for operating instruments for a vehicle according to the second embodiment of the present invention. An apparatus 200a for operating instruments for a vehicle according to the present invention is connected to a bus 1. Instruments, i.e., a CD player 2, a CD changer 3, an MD player 4, an MD changer 5, a cassette deck 6, a radio 7, a TV 8, a first information processing instrument 79, a second information processing instrument 80, and a third information processing instrument 81 are connected to the bus 1.

The first information processing instrument 79, the second information processing instrument 80, and the third information processing instrument 81 are personal computers and the like, and transmit and receive information. The apparatus 200a for operating instruments for a vehicle selects one instrument of the plurality of instruments connected to the bus 1 to operate the selected instrument. The apparatus 200a for operating instruments for a vehicle has a controller 10a, an operation unit 11a, a monitor 13, a ROM 15, a RAM 17, a LED 25, an amplifier 27, and a loudspeaker 29.

The operation unit 11a has an AV mode switch 82, an information mode switch 83, and a direction key 20. The AV mode switch 82 selects one instrument of audio/visual (AV) instruments, i.e., the CD player 2, the CD changer 3, the MD player 4, the MD changer 5, the cassette deck 6, the radio 7, and the TV 8. The information mode switch 83 selects one instrument of the first information processing instrument 79, the second information processing instrument 80, and the third information processing instrument 81.

The other configuration of the apparatus for operating instruments for a vehicle shown in FIG. 25 is the same as the corresponding portion of the apparatus for operating instruments for a vehicle shown in FIG. 6. The same reference numerals as in FIG. 6 denote the same parts in FIG. 25, and descriptions thereof will be omitted.

Figure 26:
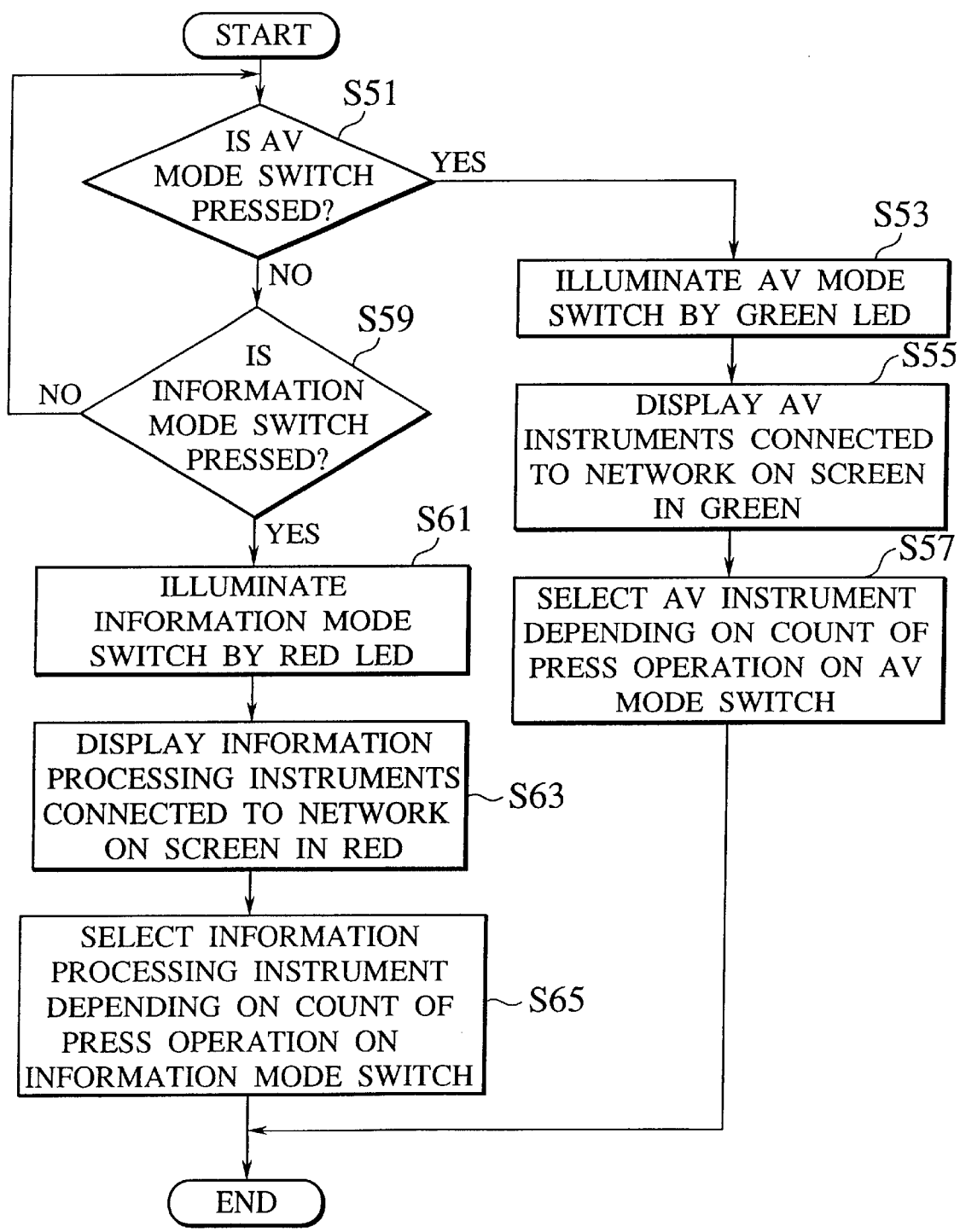
FIG. 26 is a flow chart showing an operation of a controller formed in an apparatus for operating instruments for a vehicle according to the second embodiment.

The operation of the apparatus for operating instruments for a vehicle according to the second embodiment arranged as described above will be described below. An operation of the controller 10a will be described below with reference to the flow chart in FIG. 26.

First, it is checked whether the AV mode switch 82 is pressed (step S51). If the AV mode switch 82 is pressed, the mode is switched to an AV mode. A green LED of the LEDs 25 is lit on to illuminate the AV mode switch 82 (step S53).

In addition, the names of AV instruments connected to the bus 1 are displayed on the screen in green (step S55), and an AV instrument name is selected depending on a count of press operation on the AV mode switch 82 (step S57).

Figure 27:
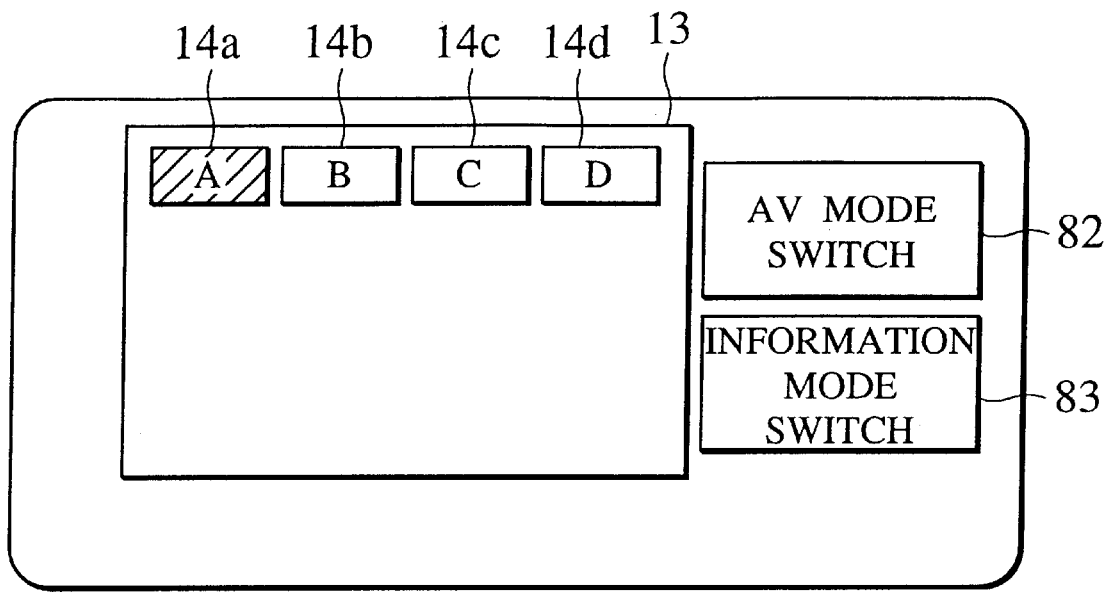
FIG. 27 is a plan view showing a state in which an AV instrument on a screen is selected by an AV mode switch when AV instruments connected to the bus are displayed on the screen.

For example, as shown in FIG. 27, when the names of the AV instruments connected to the bus 1 are displayed on the screen, and an AV instrument name on the screen is selected by the AV mode switch 82 (e.g., an A screen region 14a indicated by a hatched portion is selected), so that an operator can easily select one AV instrument while watching the screen.

Next, it is checked whether the information mode switch 83 is pressed (step S59). If the information mode switch 83 is pressed, the mode is switched to an information mode. A red LED is lit on to illuminate the information mode switch 83 (step S61).

In addition, the names of information processing instruments connected to the bus 1 are displayed on the screen in red (step S63), and an information processing instrument name is selected depending on a count of press operation on the information mode switch 83 (step S65).

Figure 28:
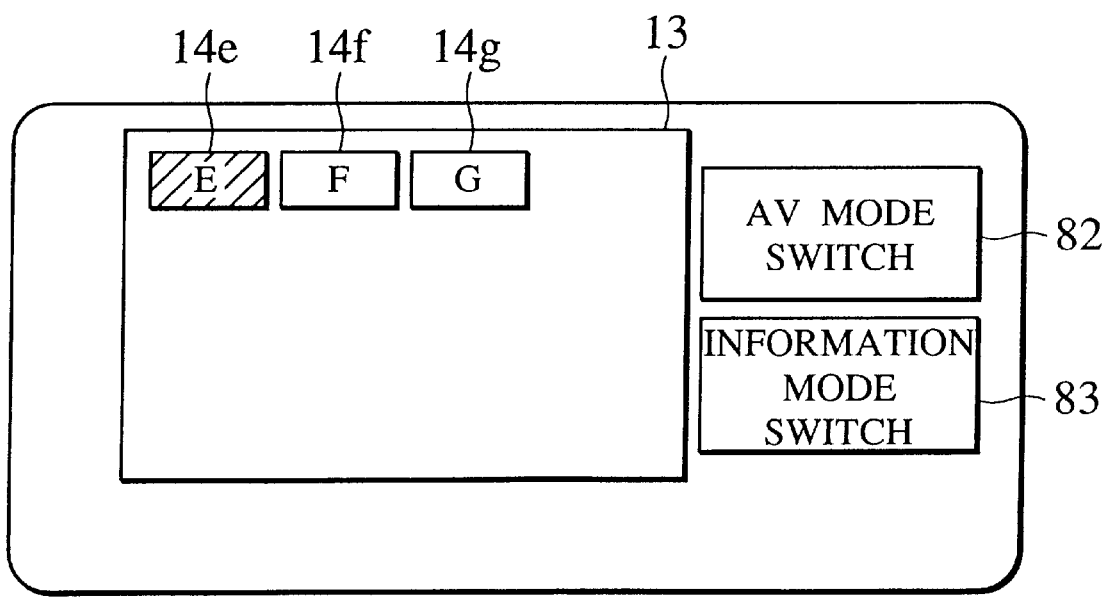
FIG. 28 is a plan view showing a state in which an information processing instrument on the screen is selected by an information mode switch when information processing instruments connected to the bus are displayed on the screen.

For example, as shown in FIG. 28, when the names of the information processing instruments connected to the bus 1 are displayed on the screen, an information processing instrument name on the screen is selected by the information mode switch 83 (e.g., an E screen region 14e indicated by a hatched portion is selected), so that an operator can easily select one information processing instrument while watching the screen.

More specifically, when the number of instruments connected to the bus 1 increases, the AV mode switch 82 and the information mode switch 83 are formed to classify the plurality of instruments connected to the bus 1 into AV type instruments and information type instruments. For example, when an AV instrument is expected to be selected, only the AV mode switch 82 may be pressed, and an instrument can be selected for a short period of time.

For example, both the color of the AV mode switch 82 and the color of the name of the AV instruments on the screen are made green, an operator can easily recognize that an AV type instrument is selected.

The present invention is not limited to the apparatuses for operating instruments for a vehicle according to the embodiments described above. Various changes and modifications of the present invention can be effected without departing from the spirit and scope of the invention.

What is claimed is:

1. An apparatus for operating instruments for a vehicle, the apparatus comprising:
   display means for displaying names of a plurality of electrical instruments connected to a bus on a screen;
   mode selection means for selecting one of the names of the plurality of electrical instruments displayed on the screen of the display means;

display control means for selectively displaying the name on the screen selected by the mode selection means;

instrument operation means for operating an electrical instrument corresponding to the name on the screen selected by the mode selection means, wherein the instrument operation means is a direction key for designating a direction, and the direction key includes:

a plurality of printed-character units on which at least one operation function for each electrical instrument is printed to be allocated; and a plurality of illumination units provided for the plurality of printed-character units, each illumination unit being arranged opposite to a corresponding printed-character unit and illuminating the corresponding printed character unit; and discrimination control means for detecting and discriminating the plurality of electrical instruments connected to the bus.

2. An apparatus for operating instruments for a vehicle according to claim 1, further comprising illumination control means for, when a name of an electrical instrument is selected by the mode selection means, operating an illumination unit to illuminate a corresponding printed-character unit, of the plurality of printed-character units, on which an operation function for the electrical instrument corresponding to the selected name is printed.

3. An apparatus for operating instruments for a vehicle according to claim 1, wherein each printed-character unit includes:

a white print unit subjected to white printing;

a color print unit stacked on an upper portion of the white print unit and subjected to color printing; and a pattern print unit stacked on the upper portion of the color print unit and having a pattern obtained by black-silk printing.

4. An apparatus for operating instruments for a vehicle according to claim 2, wherein the direction key includes:

a switch pad on which the plurality of printed-character units are formed;

a plurality of light-guide units, arranged below the switch pad and respectively formed for the plurality of printed-character units, each light-guide unit guiding light from a corresponding illumination unit to a corresponding printed-character unit;

a plurality of switches, arranged below the switch pad and respectively formed for the plurality of printed-character units, and when one of the plurality of printed-character units illuminated by the plurality of illumination units is pressed, a switch corresponding to the pressed printed-character unit being turned on; and a substrate on which the plurality of switches, the plurality of illumination units, and the plurality of light-guide units are integrally packaged.

5. An apparatus for operating instruments for a vehicle according to claim 2, wherein the direction key includes:

a switch pad on which the plurality of printed-character units and a plurality of light-guide units respectively formed for the plurality of printed-character units, each light-guide unit guiding light from a corresponding illumination unit to a corresponding printed-character unit;

a plurality of switches, arranged below the switch pad and respectively formed for the plurality of printed-character units, and when one of the plurality of printed-character units illuminated by the plurality of illumination units is pressed, a switch corresponding to the pressed printed-character unit being turned on;

a first substrate on which the plurality of switches are packaged; and a second substrate on which the plurality of illumination units are packaged, wherein there is formed, on the switch pad, a substrate holding unit for holding the second substrate on which the plurality of illumination units are packaged, to keep the second substrate tightly contacting with the plurality of light-guide units formed on the switch pad.

6. An apparatus for operating instruments for a vehicle according to claim 2, wherein the direction key includes:

a switch pad on which the plurality of printed-character units and a plurality of light-guide units respectively formed for the plurality of printed-character units, each light-guide unit guiding light from a corresponding illumination unit to a corresponding printed-character unit;

a second substrate having the plurality of illumination units packaged on a surface thereof and having a plurality of switches packaged on another surface thereof, arranged below the switch pad and respectively formed for the plurality of printed-character units, and when one of the plurality of printed-character units illuminated by the plurality of illumination units is pressed, a switch corresponding to the pressed printed-character unit being turned on; and a first substrate with which the plurality of switches are brought into contact, wherein there is formed, on the switch pad, a substrate holding unit for holding the second substrate on which the plurality of illumination units and the plurality of switches are packaged, to keep the second substrate tightly contacting with the plurality of light-guide units formed on the switch pad.

7. An apparatus for operating instruments for a vehicle according to claim 1, further comprising a printed-character display key for, when a name of an electrical instrument is selected by the mode selection means, performing designation for displaying, on the screen, printed-character contents of a printed-character unit, of the plurality of printed-character units, for printing an operation function of an electrical instrument corresponding to the selected name, wherein, when the printed-character key is pressed, the display control means displays, on the screen, the printed-character contents of the printed-character unit for printing the operation function of the electrical instrument corresponding to the selected name.

8. An apparatus for operating instruments for a vehicle according to claim 1, wherein the plurality of electrical instruments includes a plurality of audio/visual instruments and a plurality of information processing instruments, and the mode selection means includes:
AV mode selection means for selecting one of names of the plurality of audio/visual instruments displayed on a screen of the display means; and
information mode selection means for selecting one of names of the plurality of information processing instruments displayed on the screen of the display means.

9. An apparatus for operating instruments for a vehicle according to claim 8, further comprising:

a first illumination unit for illuminating the AV mode selection means;
a second illumination unit for illuminating the information mode selection means; and
illumination control means for operating the first illumination unit when the AV mode selection means is operated and operating the second illumination unit when the information mode selection means is operated.

* * * * *